United States Patent
Ohtake et al.

(10) Patent No.: US 7,489,266 B2
(45) Date of Patent: Feb. 10, 2009

(54) RADAR SYSTEM AND COMPUTER PROGRAM

(75) Inventors: Kensuke Ohtake, Yokohama (JP); Manabu Hirao, Yokohama (JP); Masahito Shingyoji, Sakado (JP); Hiroyuki Ando, Kawagoe (JP)

(73) Assignees: Honda Elesys Co., Ltd., Yokohama-Shi, Kanagawa (JP); Honda Motor Co., Ltd., Minato-Ku, Tokyo (JP)

( * ) Notice: Subject to any disclaimer, the term of this patent is extended or adjusted under 35 U.S.C. 154(b) by 295 days.

(21) Appl. No.: 11/390,141

(22) Filed: Mar. 28, 2006

(65) Prior Publication Data

US 2006/0220945 A1 Oct. 5, 2006

(30) Foreign Application Priority Data

Mar. 29, 2005 (JP) ............................. 2005-095479
Jul. 28, 2005 (JP) ............................. 2005-219027

(51) Int. Cl.
*G01S 13/58* (2006.01)
*G01S 13/93* (2006.01)

(52) U.S. Cl. ..................... 342/70; 342/107; 342/111; 342/116; 342/196

(58) Field of Classification Search .............. 342/70
See application file for complete search history.

(56) References Cited

U.S. PATENT DOCUMENTS 4,862,180 A * 8/1989 Martin ..................... 342/417
5,107,841 A * 4/1992 Sturgill ..................... 600/455
5,483,500 A * 1/1996 Capell et al. ............... 367/119
5,663,930 A * 9/1997 Capell et al. ............... 367/119
6,369,700 B1 4/2002 Yamada (Continued)

FOREIGN PATENT DOCUMENTS

JP 01-141345 6/1989

(Continued)

OTHER PUBLICATIONS

Office Action for application No. 2005-219027 dated Dec. 4, 2007.

(Continued)

*Primary Examiner*—Thomas H Tarcza
*Assistant Examiner*—Matthew M Barker
(74) *Attorney, Agent, or Firm*—Squire, Sanders & Dempsey, LLP

(57) ABSTRACT

A radar system comprises: a plurality of reception antennas; a transmission wave generating device; a transmission antenna; a mixer; an A/D converter; a storage device which stores the digitized beat signals in association with each of the reception antennas; a Fourier transformation device which Fourier transforms the stored beat signals; a digital beam forming device which generates beam signals at predetermined pitch angles based on the Fourier transformed signals; an orientation detecting device which detects an orientation of the object using the generated beam signals; a distance detecting device which detects a distance to the object using the generated beam signals; and a signal separation processing device which performs separation processing of the beat signals based on the detected orientation and distance of the object, using the beat signals associated with each of the reception antennas, which are Fourier transformed by the Fourier transformation device.

16 Claims, 9 Drawing Sheets

U.S. PATENT DOCUMENTS

| | | | |
|---|---|---|---|
| 6,573,859 B2 * | 6/2003 | Tokoro | 342/70 |
| 6,657,582 B2 | 12/2003 | Seki et al. | |
| 7,151,482 B2 * | 12/2006 | Natsume et al. | 342/147 |
| 7,190,305 B2 * | 3/2007 | Isaji | 342/70 |
| 2003/0179130 A1 * | 9/2003 | Kumon et al. | 342/70 |
| 2004/0183719 A1 * | 9/2004 | Natsume et al. | 342/147 |
| 2004/0207552 A1 * | 10/2004 | Isaji | 342/70 |
| 2005/0156780 A1 * | 7/2005 | Bonthron et al. | 342/107 |
| 2006/0262007 A1 * | 11/2006 | Bonthron et al. | 342/70 |

FOREIGN PATENT DOCUMENTS

| | | |
|---|---|---|
| JP | 05-297121 | 11/1993 |
| JP | 06-088869 | 3/1994 |
| JP | 06-161339 | 6/1994 |
| JP | 07-134173 | 5/1995 |
| JP | 2000-75028 | 3/2000 |
| JP | 2000-199786 | 7/2000 |
| JP | 2001-116832 | 4/2001 |
| JP | 2001-349941 | 12/2001 |
| JP | 2002-257925 | 9/2002 |
| JP | 2003-177179 | 6/2003 |
| JP | 2006-275840 | 10/2006 |
| JP | 2006275840 A * | 10/2006 |

OTHER PUBLICATIONS

Institute of Electronics and Communication Engineers of Japan, "Antenna Technology Handbook", Sep. 30, 1991, pp. 188-191—with English translation of a part from p. 190-191.

Japanese Office Action for Japanese Patent Application No. 2005-219027 issued Sep. 4, 2007.

* cited by examiner

FIG. 6
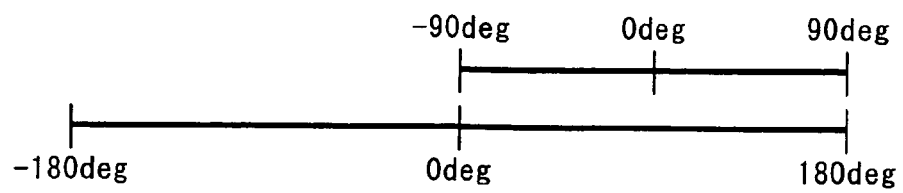
FIG. 7A
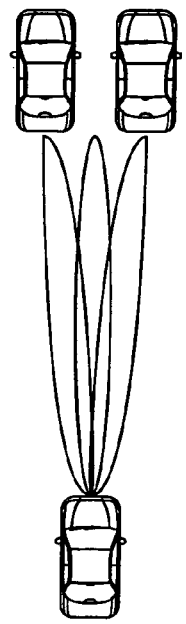
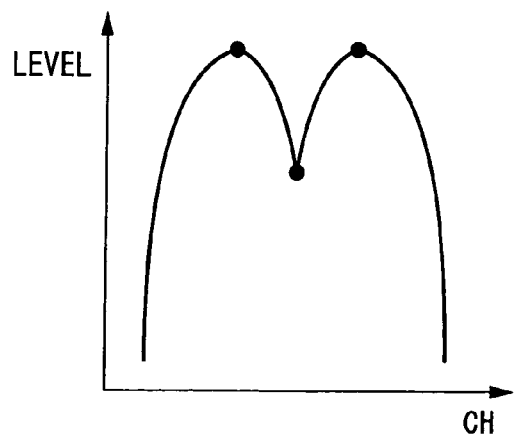
FIG. 7B
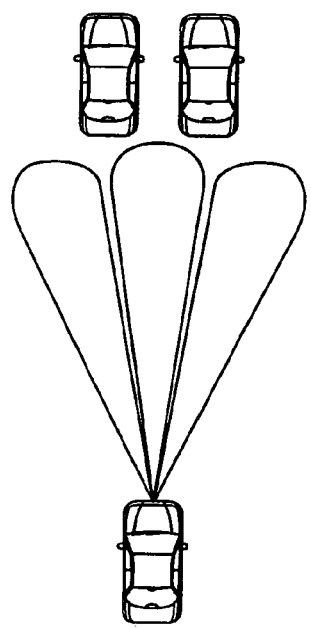
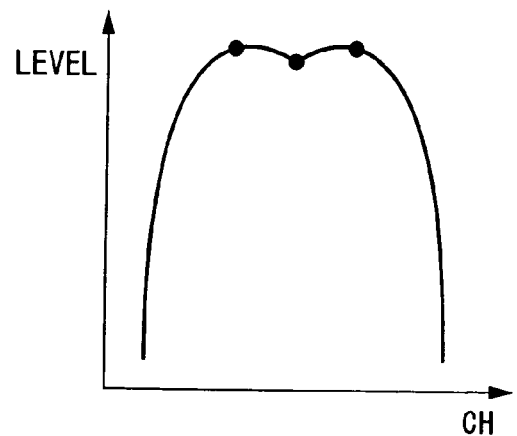

RADAR SYSTEM AND COMPUTER PROGRAM

BACKGROUND OF THE INVENTION

Priority is claimed on Japanese Patent Application No. 2005-95479, filed Mar. 29, 2005, and Japanese Patent Application No. 2005-219027, filed Jul. 28, 2005, the contents of which are incorporated herein by reference.

1. Field of the Invention

The present invention relates to a radar system and a computer program to be used therefor. In particular, it relates to a vehicular electronic scanning millimeter wave radar system and a computer program ideally suited for detecting objects.

2. Description of the Related Art

Heretofore, for a vehicular electronic scanning millimeter wave radar system, there are known beam scanning methods, of a mechanical type that scans a single beam mechanically in the horizontal direction, and of an electric type (for example refer to Japanese Unexamined Patent, First Publication No. H06-88869) that scans a plurality of beams electrically in the horizontal direction. However, in either one of the methods, in the case where there are adjacent objects, it is necessary to narrow the width of the beam to be transmitted from a transmission antenna in order to improve the separation function of the objects in the horizontal direction.

For example, FIGS. 7A and 7B shows the case where transmission waves are transmitted from a transmission antenna of an electronic millimeter wave radar system installed in a following vehicle, and incoming waves from two vehicles in front are received by a three channel receiving antenna. However, as shown in FIG. 7B, in the case where the width of the beam of a transmission wave is wide, the central beam of the received incoming waves (received waves) consists of incoming waves (received waves) received from both of the vehicles in front. Hence the difference in the levels between the channels is small. Consequently, the separation function deteriorates, and hence there is a problem in that the two vehicles in front cannot be captured accurately.

Therefore, in order to solve the above problem, as shown in FIG. 7A, it is necessary to narrow the width of the beam of the transmission wave in order to increase the difference in the levels of received waves from adjacent channels. However, in order to realize this, it is necessary to increase the areas of the transmission antenna and the reception antenna (for example, refer to pages 188 to 191 of "Antenna Technology Handbook" compiled by the Institute of Electronics and Communication Engineers of Japan, published Sep. 30, 1991).

As described above, in order to improve the separation function, it is effective to increase the areas of the transmission antenna and the reception antenna, and to narrow the width of the beam. However, if the areas of the transmission antenna and the reception antenna are increased, there is a conflicting problem in that it is difficult to miniaturize the whole system, and to reduce the cost.

The present invention takes the above problems into consideration with an object of providing a radar system and a computer program, that improve the separation function of objects in the horizontal direction regardless of the width of the beam transmitted from a transmission antenna.

SUMMARY OF THE INVENTION

The present invention uses the following technique in order to solve the above problems.

That is, a radar system of the present invention comprises: a plurality of reception antennas which receive incoming waves reflected by an object; a transmission wave generating device which generates transmission waves; a transmission antenna which transmits transmission waves; a mixer which mixes the received waves received by the reception antennas and the transmission waves, and generates beat signals; an A/D converter which converts the beat signals to digital signals; a storage device which stores the digitized beat signals in association with each of the reception antennas; a Fourier transformation device which Fourier transforms the stored beat signals; a digital beam forming device which generates beam signals at predetermined pitch angles based on the Fourier transformed signals; an orientation detecting device which detects an orientation of the object using the generated beam signals; a distance detecting device which detects a distance to the object using the generated beam signals; and a signal separation processing device which performs separation processing of the beat signals based on the detected orientation and distance of the object, using the beat signals associated with each of the reception antennas, which are Fourier transformed by the Fourier transformation device.

Furthermore, a computer program of the present invention is a computer program used for a radar system, for executing on a computer; a first step for mixing received waves received by reception antennas, and transmission waves to generate beat signals, converting the beat signals to digital signals, and storing them in association with each of the reception antennas; a second step for Fourier transforming the stored beat signals; a third step for generating beam signals at predetermined pitch angles, based on the Fourier transformed signals; a fourth step for detecting an orientation of an object using the generated beam signals; a fifth step for detecting a distance to the object using the generated beam signals; a sixth step for detecting whether or not there is a plurality of objects at almost the same distance in the Fourier transformed beat signals corresponding to each of the reception antennas, based on the detected orientation and distance of the object; and a seventh step for performing separation processing of the beat signals.

According to the radar system and the computer program, the construction is such that, based on the orientation and distance of an object detected from the Fourier transformed beat signals corresponding to each of the reception antennas, separation processing is performed on the beat signals. Accordingly, it is possible to specify a plurality of separation processing objects and execute separation processing appropriately.

The signal separation processing device may perform separation processing of a signal using the maximum entropy method.

In this case, it is not necessary to use a transmission beam with a narrow width in order to improve the separation function.

The signal separation processing device may perform separation processing of the signal by using only either one of the real number parts and the imaginary number parts of the signals corresponding to each of the reception antennas, generated by the Fourier transformation device.

In this case, although the processing of the complex calculation in the maximum entropy method is generally complicated, since the signal separation processing device does the calculation using only the real number parts of the complex data after Fourier transformation, the calculation process can be simplified.

The signal separation processing device may perform separation processing of the signal by using the real number parts or the imaginary number parts of the signals corresponding to each of the reception antennas, generated by the Fourier transformation device, switching them alternately according to the location of the reception antennas.

In this case, by performing the calculation processing using, alternately, the real number parts and the imaginary number parts of the complex number data for each signal vector in the adjacent reception antennas, it is possible to eliminate some of the processing required in the calculation process by using only the real number parts or the imaginary number parts. Hence the calculation process can be simplified.

The radar system may be installed in a vehicle, and may further comprise: a determination area setting device which sets a predetermined determination area in order to determine an object in front of a subject vehicle; and a separation object determination device which defines an object in the determination area as a separation object, based on at least a distance to the detected object and the set determination area. The signal separation processing device may perform separation processing of the beat signals, based on the object that is determined as being in the determination area by the separation object determination device.

In this case, it is possible to define the object in the determination area as a priority separation object. Furthermore, since the determination area is set, then even in the case where a maximum entropy method with a high calculation load is used, it is possible to complete separation processing within a predetermined processing time.

There may be further provided a track estimation device which estimates a vehicular swept path of a subject vehicle, and the determination area setting device may set the determination area in front of the subject vehicle, based on the estimated vehicular swept path of the vehicle, and the separation object determination device may determine the object in the determination area as a separation object, based on the detected orientation and distance of the object, and the set determination area.

In this case, it is possible to execute priority separation processing of the object that is on the estimated vehicular swept path of the subject vehicle. Therefore, it is possible to execute separation processing of an object that is on the path ahead of the vehicle, and that can be an obstruction to the travel of the subject vehicle.

The separation object determination device may determine an object for which the detected distance to the object is greater than or equal to a first predetermined value, as a separation object. Here, the predetermined value denotes a value of a short distance wherein there is no problem for vehicle control, and the separation function can be ensured, even if a normal object detection method is used.

In this case, since such an object at a short distance is defined as a non-object, it is possible to execute priority separation processing of an object that is beyond the relative distance, where the separation function drops.

The separation object determination device may determine an object for which the detected distance to the object is less than or equal to a second predetermined value, as a separation object. Here, the predetermined value denotes a relative distance where the degree of danger to the travel of the subject vehicle is low, the level of the received signal from the object is weak, and accurate separation processing cannot be expected.

In this case, since such an object at a far distance is defined as a non-object, the reliability of separation processing is enhanced. Hence it is possible to execute priority separation processing of an object that has a high degree of danger to the subject vehicle.

The second predetermined value may be greater than the first predetermined value.

In this case, since an object is limited depending on its relative distance from the subject vehicle, it is possible to execute priority separation processing of an object in an area where the degree of danger to the travel of the subject vehicle is high, and sufficient separation processing quality can be expected.

The separation object determination device may determine the detected object for which a detected relative speed is a value indicating that it is approaching the subject vehicle, as a separation object.

In this case, separation processing is executed for an object whose relative speed is in a direction approaching the subject vehicle. Therefore, even in the case where a plurality of objects is detected in front of the subject vehicle, it is possible to execute priority separation processing of objects moving in the approaching direction, which are obstructions to the travel of the subject vehicle.

According to the present invention described above, there is an effect of improving the separation function of an object in the horizontal direction regardless of the width of the beam to be transmitted from a transmission antenna.

Furthermore, since it is not necessary to narrow the width of the beam to be transmitted from the transmission antenna according to the separation function, there are effects of miniaturizing the whole system, and enabling the cost to be reduced.

Moreover, since the data to be input to the separation processing section, for which the maximum entropy method is used, are only the real number parts of the signals generated in the Fourier transformation section, there is an effect of enabling the processing time to be shortened.

Furthermore, in the present invention, since the determination area is set and objects are limited, it is possible to execute separation processing within a predetermined processing time without using a CPU with a high calculation processing capability. Therefore, it is possible to prevent an increase in the cost of the whole system.

BRIEF DESCRIPTION OF THE DRAWINGS

FIG. 6 is a diagram showing detection range in the case where the processing is performed by using complex number data, and detection range in the case where the processing is performed by using only the real number parts.

FIGS. 7A and 7B are diagrams showing conventional problems.

DETAILED DESCRIPTION OF THE INVENTION

Hereunder is a detailed description of an electronic scanning millimeter wave radar system (a radar system) according to embodiments of the present invention, with reference to FIG. 1 to FIG. 14.

First Embodiment

Figure 1:
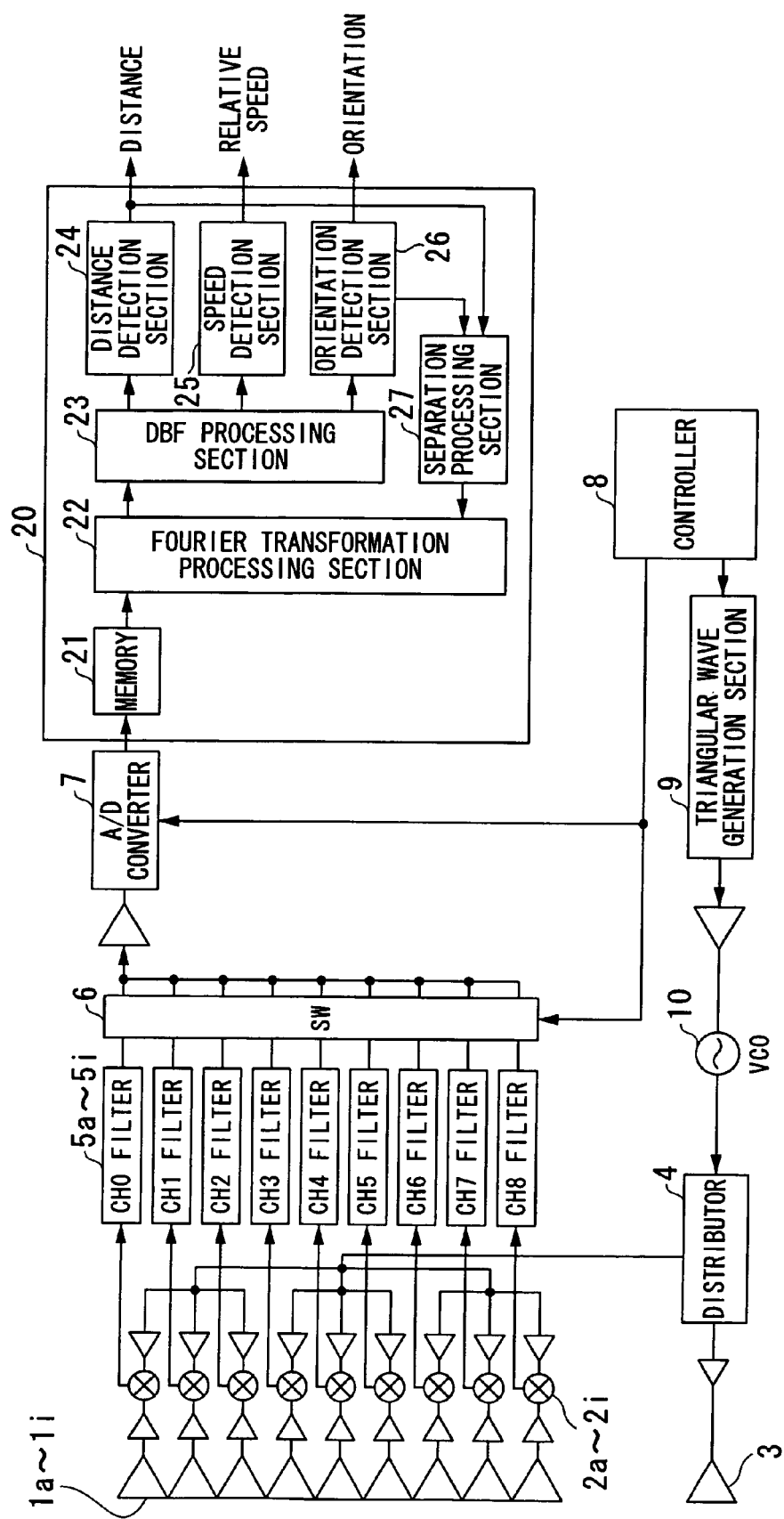
FIG. 1 is a block diagram of an electronic scanning millimeter wave radar system according to a first embodiment of the present invention.

An electronic scanning millimeter wave radar system according to a first embodiment of the present invention, as shown in FIG. 1, comprises: reception antennas $1a$ to $1i$; mixers $2a$ to $2i$; a transmission antenna 3; a distributor 4; filters $5a$ to $5i$; a switch 6; an A/D converter 7; a controller 8; a triangular wave generation section 9; a VCO (Voltage Controlled Oscillator) (transmission wave generating device) 10; and a signal processing section 20, wherein the signal processing section 20 comprises: a memory (storage device) 21; a Fourier transformation processing section (Fourier transformation device) 22; a DBF (Digital Beam Forming) processing section (digital beam forming device) 23; a distance detection section (distant detection device) 24; a speed detection section 25; an orientation detection section (orientation detection device) 26; and a separation processing section (signal separation processing device) 27.

The reception antennas $1a$ to $1i$ are antennas which receive waves incoming from an object. In the present embodiment, there are nine reception antennas. The mixers $2a$ to $2i$ mix transmission waves transmitted from the transmission antenna 3, and signals that are received by each of the reception antennas $1a$ to $1i$ and amplified by amplifiers, and generate beat signals.

The transmission antenna 3 transmits a transmission signal, which is generated by frequency modulating a signal generated in the triangular wave generation section 9 in the VCO 10, to an object. The distributor 4 distributes the frequency modulated signal from the VCO 10 to the mixers $2a$ to $2i$ and the transmission antenna 3. The filters $5a$ to $5i$ limit the bandwidths of the beat signals of the channels corresponding to each of the reception antennas $1a$ to $1i$, that have been generated in the mixers $2a$ to $2i$.

The switch 6 switches the signals of the channels corresponding to each of the reception antennas $1a$ to $1i$ passing through the filters $5a$ to $5i$ sequentially, and supplies them to the A/D converter 7. The A/D converter 7 converts the beat signals for each channel corresponding to each of the reception antennas $1a$ to $1i$, input via the switch 6, to digital signals. The controller 8 controls the whole unit based on a control program stored in a ROM or the like (not shown in the figure).

Next, the memory 21 in the signal processing section 20 stores the digital signals that have been converted to digital by the A/D converter 7 for each channel corresponding to each of the reception antennas $1a$ to $1i$. The Fourier transformation processing section 22 performs Fourier transformation processing of the signals for each channel corresponding to each of the reception antennas $1a$ to $1i$, stored in the memory 21. The DBF processing section 23 generates beams having predetermined angle pitches by performing digital beam forming processing (DBF) of each signal Fourier transformed in the Fourier transformation processing section 22.

The distance detection section 24 detects the distance to an object using the signals to which digital beam forming processing (DBF) has been applied. The speed detection section 25 detects the speed of the object using the signals to which digital beam forming processing (DBF) has been applied. The orientation detection section 26 detects the orientation of the object using the signals to which digital beam forming processing (DBF) has been applied.

When the separation processing section 27 determines that there is a plurality of objects at almost the same distance, using the beat signals corresponding to each of the reception antennas $1a$ to $1i$, which have been Fourier transformed by the Fourier transformation processing section 22, it performs separation processing on the beat signals corresponding to each of the reception antennas $1a$ to $1i$, which have been Fourier transformed by the Fourier transformation processing section 22. In the present embodiment, the maximum entropy method is used for the separation processing.

Figure 2:
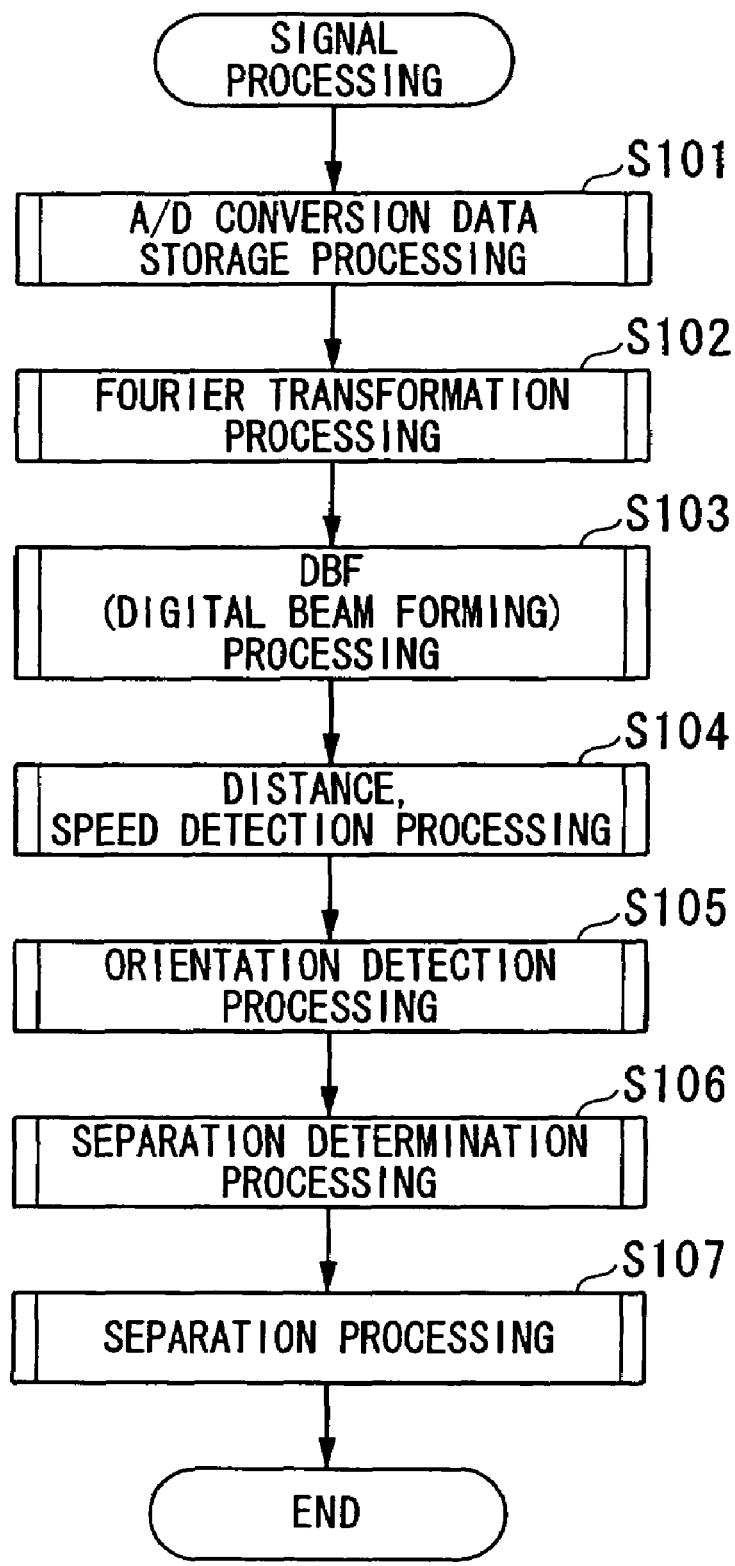
FIG. 2 is a processing flow of the electronic scanning millimeter wave radar system according to the embodiment.

Next is a description of the processing of an electronic scanning millimeter wave radar system according to the present embodiment using FIG. 2.

The triangular wave generation section 9 generates a triangular wave using a control signal from the controller 8, and when this is output to the VCO 10, the VCO 10 modulates the frequency of the triangular wave signal and generates a transmission signal. This transmission signal is supplied to the mixers $2a$ to $2i$ or the transmission antenna 3 via the distributor 4, and the transmission antenna 3 transmits the transmission signal forward as a radio wave.

When the transmission waves are reflected by an object such as an oncoming vehicle or the like, and received as reception signals by the reception antennas $1a$ to $1i$, the mixers $2a$ to $2i$ mix the reception signals and the transmission signal from the VCO 10, and generate beat signals containing Doppler frequency elements. The generated beat signals are input to the switch 6 after passing through the filters $5a$ to $5i$ for bandwidth limiting. The switch 6 switches in sequence at predetermined timing, and inputs the signals corresponding to each of the reception antennas $1a$ to $1i$, which have passed through the filters $5a$ to $5i$, to the A/D converter 7.

The signals input to the A/D converter 7 are converted to digital signals, and the converted digital signals are sorted by channel corresponding to each of the reception antennas $1a$ to $1i$, and stored in a predetermined area of the memory 21 (step 101). Next, the digital signals stored in the memory 21 are read out sequentially, and Fourier transformation processing is performed in the Fourier transformation processing section 22 (step 102). At this time, in the Fourier transformation processing section 22, real Fourier transformation is executed, in which only the real number parts are input from among the data stored in the memory 21.

Next, the data that have been real Fourier transformed in the Fourier transformation processing section 22 are output to the DBF processing section 23, and here digital beam forming processing is executed (step 103). The digital beam forming processing forms beams having optional pitches by further Fourier transforming in the spatial axis direction for each predetermined frequency point, the reception signals of the reception antennas, which have been Fourier transformed.

The distance detection section 24 and the speed detection section 25 select the beat frequencies on the rising section side and the falling section side of each of the beat signals for which digital beam forming processing has been executed in the DBF processing section 23, and calculate the distance and the relative speed by using a predetermined calculation using the beat frequencies (step 104). Furthermore, the orientation detection section 26 detects the orientation of the object based on the beam signals having predetermined angle pitches, which are generated by executing digital beam forming processing in the DBF processing section 23 (step 105).

Next, the separation processing section 27 determines whether or not the oncoming direction of the received waves is at an angle greater than a predetermined angle based on; the distance to the object detected by the distance detection section 24, the speed of the object detected by the speed detection section 25, and the orientation of the object detected by the orientation detection section 26 (step 106). When the oncoming direction of the received waves is at an angle greater than the predetermined angle, it performs separation processing, and outputs the orientations of a plurality of objects (step 107).

In the present embodiment, the maximum entropy method is used for the separation processing by the separation processing section 27. The maximum entropy method estimates a high resolution spectrum by estimating an auto-correlation function having a large lag, which cannot be measured in isolation, such that the information entropy becomes the maximum, from limited measuring waves.

The concept will be described using FIG. 3. For example, it is considered that the beat signal is expressed using an autoregressive model. Here, if the beat signal waveform is expressed by formula 1 below, then this cosine wave can be expressed as a total of two decaying signal waves using Euler's formula, and hence it becomes as in formula 2 below.

$$x(t) = A\cos(\omega t) \quad \text{[Formula 1]}$$

$$\begin{aligned} x(t) &= A\cos(\omega t) \\ &= A/2\{e(j\omega t) + e(-j\omega t)\} \end{aligned} \quad \text{[Formula 2]}$$

Figure 3:
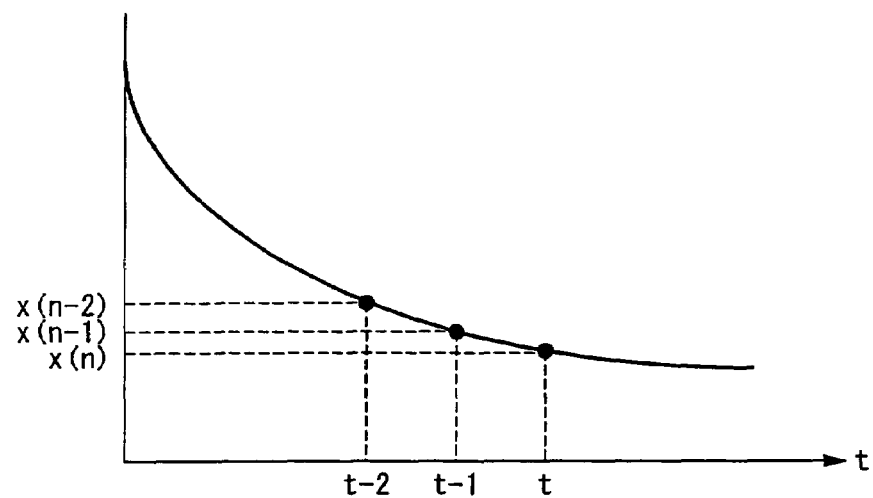
FIG. 3 is a diagram showing the concept of an autoregressive model in the maximum entropy method.

Formula 2 is illustrated as shown in FIG. 3 with the horizontal axis as t. Here, autoregressive model denotes a model that describes the current value (X(n) in FIG. 3) using values from previous instances (X(n−1), X(n−2) in FIG. 3). Accordingly, if this is applied to an autoregressive model of a single cosine signal waveform, it becomes as in formula 3 below. Here, in formula 3 below, $a_1$ and $a_2$ denote autoregressive coefficients.

$$x(n) = a_1 * x(n-1) + a_2 * x(n-2) \quad \text{[Formula 3]}$$

In the case where the number of wave sources is m, a single cosine wave becomes a secondary autoregressive model as shown in formula 3. Therefore, the total of m cosine wave elements can be expressed as a $2m^{th}$ autoregressive model.

Accordingly, in the case where the beat signal is two wave sources, the signal vector $Rx_i$ (i=0 to 8) of each of the reception antennas is expressed by the determinant of a 4×4 matrix as in formula 4 below. Then, by obtaining the autoregressive coefficient $a_i$ of the determinant by using the method of least squares or the Burg method as in formula 5 below, it is possible to estimate the decay constant, and the oscillation frequency of a signal vector $Rx_i$ (i=0 to 8), in each of the reception antennas.

$$\begin{bmatrix} Rx4 \\ Rx5 \\ Rx6 \\ Rx7 \end{bmatrix} = \begin{bmatrix} Rx3 & Rx2 & Rx1 & Rx0 \\ Rx4 & Rx3 & Rx2 & Rx1 \\ Rx5 & Rx4 & Rx3 & Rx2 \\ Rx6 & Rx5 & Rx4 & Rx3 \end{bmatrix} \begin{bmatrix} a_1 \\ a_2 \\ a_3 \\ a_4 \end{bmatrix} \quad \text{[Formula 4]}$$

$$a = ([D]^t[D])^{-1}[D]^t d \quad \text{[Formula 5]}$$

Figure 8A:
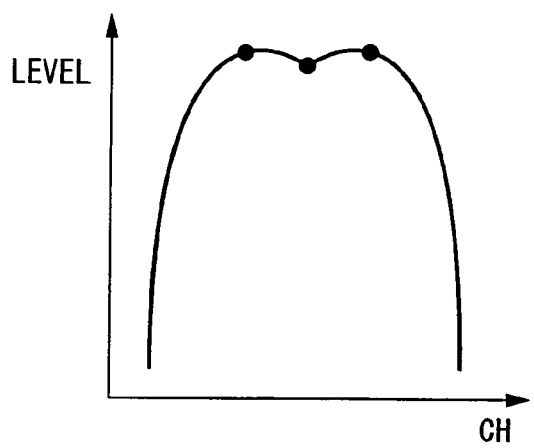
FIGS. 8A and 8B are diagrams showing received wave spectra in the case where signal separation processing is performed by using the maximum entropy method.
Figure 8B:
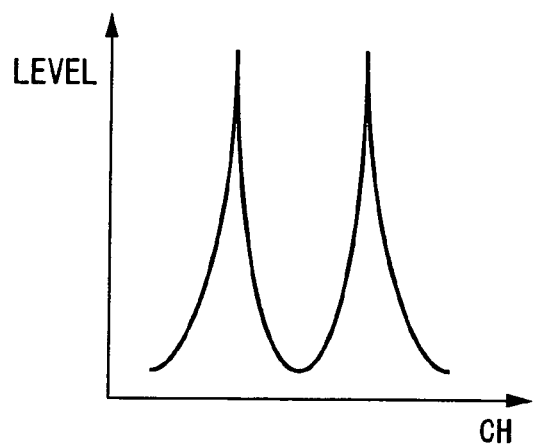

That is, by using the maximum entropy method, it is possible to separate clearly the peaks of the frequency elements, which cannot be separated by FFT. Therefore, in the present embodiment, even in the case where no difference occurs in the level of the channels as shown for example in FIG. 7B, it is possible to separate an object clearly as shown in FIG. 8B.

Furthermore, in the separation processing section 27, processing by the maximum entropy method is performed by using only the real number parts or the imaginary number parts of the complex number data for each of the reception antennas 1*a* to 1*i*, that have been generated in the Fourier transformation processing section 22. To be specific, an example will be described in which calculation is performed using only the real number parts of the complex number data, with reference to FIG. 4 to FIG. 6.

Figure 4:
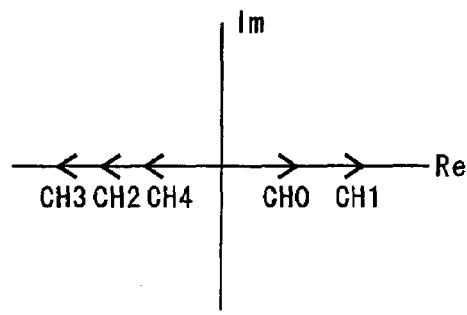
FIG. 4 is a diagram showing signal vectors in the case where only the real number parts of the complex number data obtained from each reception antenna are used for processing.

The reason that only the real number parts of the complex number data are used for calculation is to simplify the calculation process in order to shorten the processing time. However, if calculations are performed using only the real number parts of the complex number data, then as shown in FIG. 4, the signal vectors (CH0 to CH4 in the figure) in each of the reception antennas converge on the real number axis, and hence the orientation cannot be determined using the processing results by the maximum entropy method.

Figure 5:
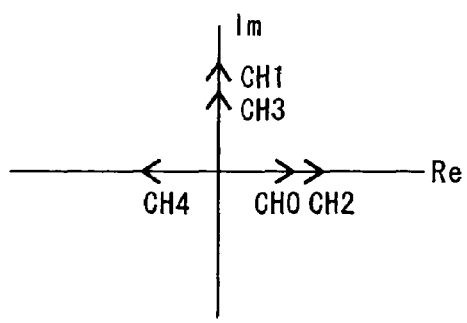
FIG. 5 is a diagram showing each of the signal vectors in the case where processing is added whereby their phases are shifted by 90 degrees in sequence relative to FIG. 4.

Therefore, orientation determination is made possible by performing in sequence processing in which signal vectors in adjacent reception antennas are each shifted in phase by 90 degrees in sequence, that is, as shown in FIG. 5, processing such that CH1*i is formed by shifting the phase of CH1 by 90 degrees from CH0, and CH2*i*i is formed by shifting the phase of CH2 by 90 degrees from CH1*i.

As a result, as shown in FIG. 6, the orientation detecting range is narrowed to −90 degrees to 90 degrees compared with −180 degrees to 180 degrees in the case where complex number calculation is performed, but there is no problem with the orientation determination. Furthermore, calculation using only the imaginary number parts of the complex number data can also be performed similarly.

Moreover, if as an alternative to the above-described method, the real number parts or the imaginary number parts of the complex number data are used alternately for each of the signal vectors in adjacent reception antennas, similar processing can also be performed. In this case, since processing for shifting the phase by 90 degrees is not required, the calculation process can be further simplified to shorten the processing time.

Consequently, according to the present embodiment, by performing separation processing of signals using the maximum entropy method, it is possible to improve the separation function of objects in the horizontal direction, regardless of the width of the beam transmitted from a transmission antenna. Furthermore, since the data to be input to the separation processing section, for which the maximum entropy method is used, are only the real number parts or the imaginary number parts of the signals generated in the Fourier transformation section, the processing time can be shortened. Moreover, by using the real number parts or the imaginary number parts of the complex number data alternately for each signal vector of adjacent reception antennas, the processing time can be further shortened.

Second Embodiment

Figure 11:
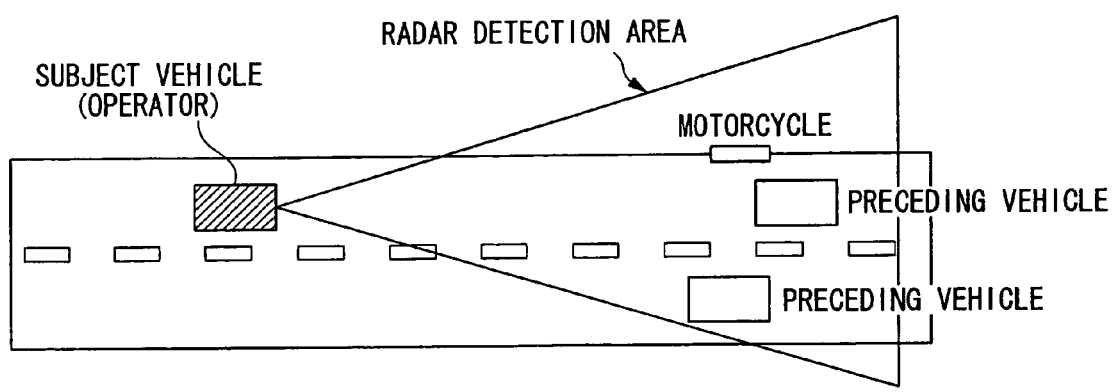
FIG. 11 is a diagram showing a detection area in the first embodiment.

In the first embodiment described above, in the case where a plurality of objects is inside a radar detection area as shown in FIG. 11, separation processing is executed for all the objects. However, especially in separation processing in which the maximum entropy method is used, which has a large calculation processing load, then the more objects, the larger the calculation load. As a result it can be expected that the processing time becomes longer. Therefore, in a second embodiment, an embodiment for correcting the problem in the first embodiment will be described.

Figure 9:
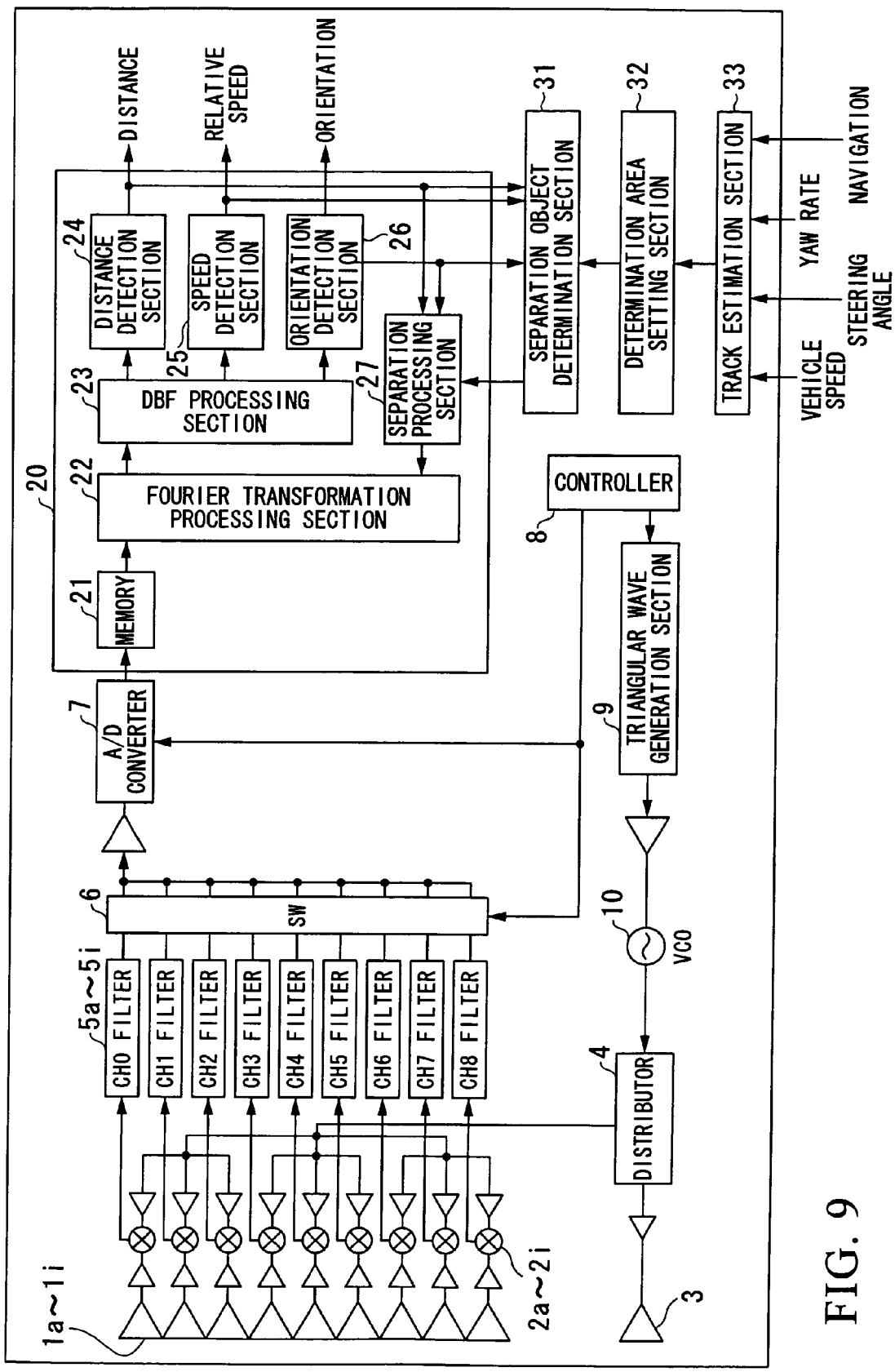
FIG. 9 is a block diagram of an electronic scanning millimeter wave radar system according to a second embodiment of the present invention.

An electronic scanning millimeter wave radar system according to the second embodiment, as shown in FIG. 9, comprises: reception antennas 1a to 1i; mixers 2a to 2i; a transmission antenna 3; a distributor 4; filters 5a to 5i; a switch 6; an A/D converter 7; a controller 8; a triangular wave generation section 9; a VCO (Voltage Controlled Oscillator) (transmission wave generating device) 10; and a signal processing section 20, wherein the signal processing section 20 comprises: a memory (storage device) 21; a Fourier transformation processing section (Fourier transformation device) 22; a DBF (Digital Beam Forming) processing section (digital beam forming device) 23; a distance detection section (distant detection device) 24; a speed detection section 25; an orientation detection section (orientation detection device) 26; and a separation processing section (signal separation processing device) 27; and moreover there is provided a separation object determination section (separation object determination device) 31; a determination area setting section (determination area setting device) 32; and a track estimation section (track estimation device) 33. Here, parts with the same symbols as in the first embodiment have the same functions, and hence the detailed descriptions are omitted.

The separation object determination section 31 specifies an object located in a determination area set in the determination area setting section 32, as a separation processing object. The determination area setting section 32 sets the area in which to determine an object in front of the subject vehicle. To be specific, it specifies the determination area based on the estimated vehicular swept path information of the subject vehicle output from the track estimation section 33. The track estimation section 33 estimates the estimated vehicular swept path of the subject vehicle based on the vehicle speed information from a vehicle speed sensor, and steering angle information from a steering angle sensor, the yaw rate from a yaw sensor, and navigation information from a navigation system such as a GPS or the like, which are not shown in the figure.

Figure 10:
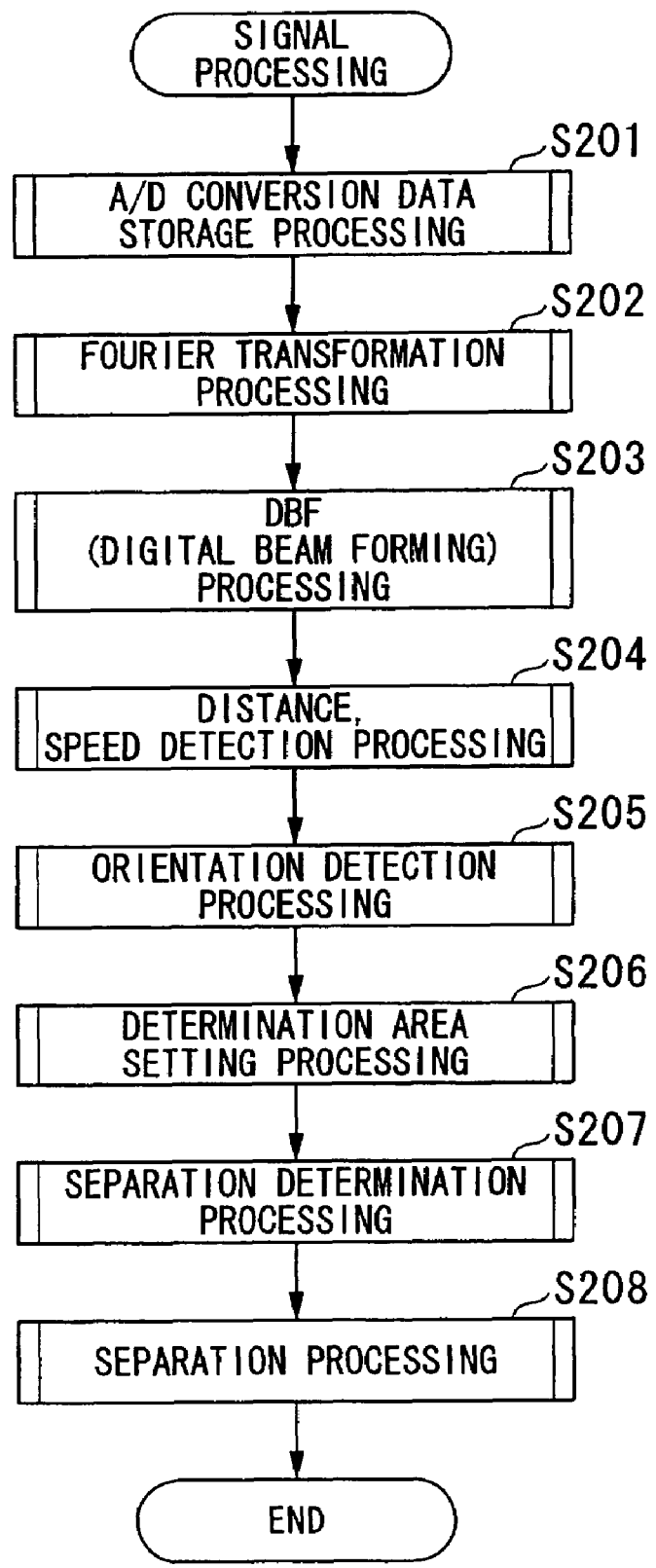
FIG. 10 is a processing flow of the electronic scanning millimeter wave radar system according to the second embodiment.

Next is a description of the processing of an electronic scanning millimeter wave radar system according to the second embodiment, using FIG. 10.

Here, the processing from S201 to S205 in FIG. 10 is the same as the processing from S101 to S105 in the first embodiment, and hence the detailed descriptions are omitted.

Figure 12:
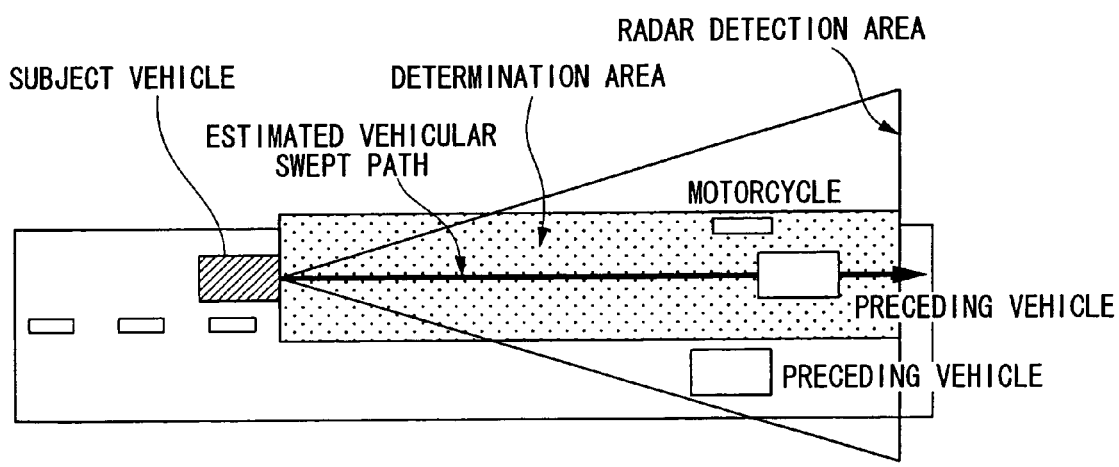
FIG. 12 is a diagram showing a detection area in the second embodiment.

When Fourier transformation processing and DBF processing are performed on reception signals received by the reception antennas 1a to 1i, and detection of the distance, speed, and orientation is completed, the processing for setting a determination area is executed by the determination area setting section 32 (step 206). Here, the determination area setting section 32, as shown in FIG. 12 for example, sets a determination area in the location where the radar detection area and the estimated vehicular swept path of the subject vehicle overlap, using the estimated vehicular swept path of the subject vehicle obtained from the track estimation section 33. In this manner, by setting the determination area, and executing the following separation determination processing (step 207) and separation processing (step 208), in the case of FIG. 12, priority separation processing of a motorcycle and a preceding vehicle, which are traveling on the line of travel of the subject vehicle and are to be given attention as the object, can be executed. That is, in the example of FIG. 12, even in the case where there is a plurality of objects, priority separation processing can be executed for the objects located in the determination area set by the estimated vehicular swept path. Therefore, it is possible to execute priority separation processing of an object with a high probability of being an obstacle to the subject vehicle travel.

Third Embodiment

A third embodiment is a modified example of the second embodiment, and the structure and main processing procedures are the same as in the second embodiment. However, since there are differences in the determination area setting section and the determination area setting processing, the description will center around these points.

In the third embodiment, a determination area setting section 32 sets a determination area such that it limits the radar detection area depending on the relative distance from the subject vehicle. The setting of the set area in this case is in the radar detection area, which may be an area whose relative distance from the subject vehicle is greater than or equal to a predetermined value. In this manner, even if a normal object detection method is used, excluding objects at a short distance with which there is no problem to vehicle control and where the separation function of the objects can be ensured, priority separation processing is performed for an object that is farther away than a predetermined relative distance, where the separation function of the object drops. Here, the predetermined value denotes a value of a short distance where even if a normal object detection method is used, there is no problem to vehicle control, and the separation function can be ensured.

Figure 13:
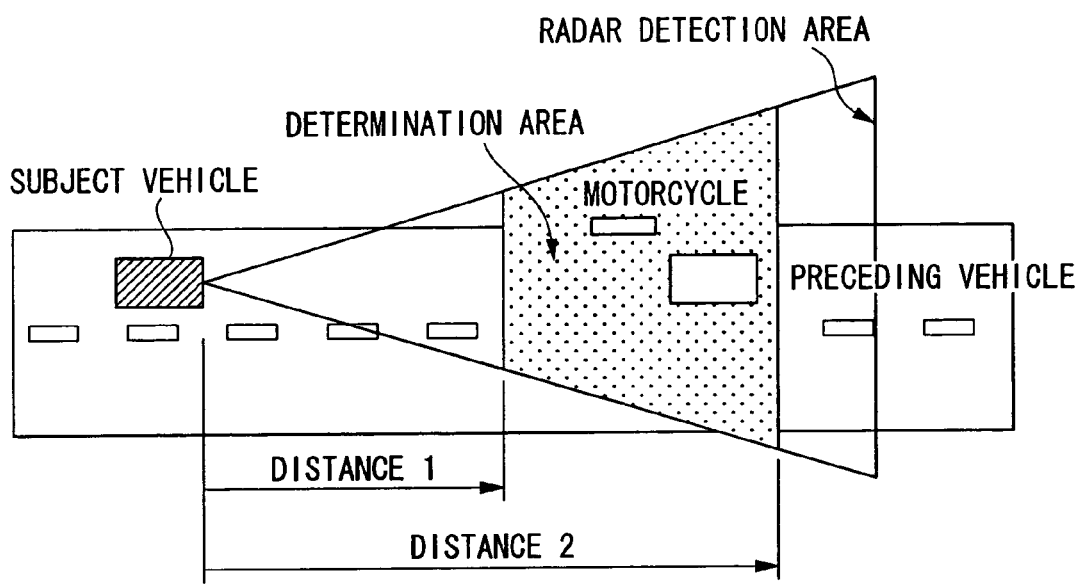
FIG. 13 is a diagram showing a detection area in a third embodiment.

Furthermore, as shown in FIG. 13, the determination area may be an area that is inside the radar detection area, and in which the relative distance from the subject vehicle is greater than or equal to a first predetermined value and less than or equal to a second predetermined value. This is because in many cases an object located far away is generally a comparatively low risk to the subject vehicle, and the level of a reception signal from an object located far away is weak, and hence even if separation processing of an object is performed based on the reception signal, accurate separation processing cannot always be performed. Here, the first predetermined value denotes a value of a short distance where even if a normal object detection method is used, there is no problem to vehicle control, and the separation function can be ensured. The second predetermined value denotes a relative distance that has a low risk to the travel of the subject vehicle, the level of a reception signal from an object is weak, and accurate separation processing cannot be expected. FIG. 13 shows an example in which the radar detection area is limited to a relative distance from the subject vehicle. However, the detection area may be further limited depending on the estimated vehicular swept path of the subject vehicle obtained from the track estimation section 33.

In this case, since the detection area is further limited depending on the estimated vehicular swept path of the subject vehicle, it is possible to execute priority separation of an object that has a high risk to the travel of the subject vehicle.

Fourth Embodiment

A fourth embodiment is a modified example of the second embodiment, and the structure and main processing procedures are the same as in the second embodiment. However, since there are differences in the determination area setting section and the determination area setting processing, the description will center around these points.

In the fourth embodiment, a detection area setting section 31 limits the detection area depending on the estimated vehicular swept path of the subject vehicle obtained from a track estimation section 33 relative to a radar detection area.

Figure 14:
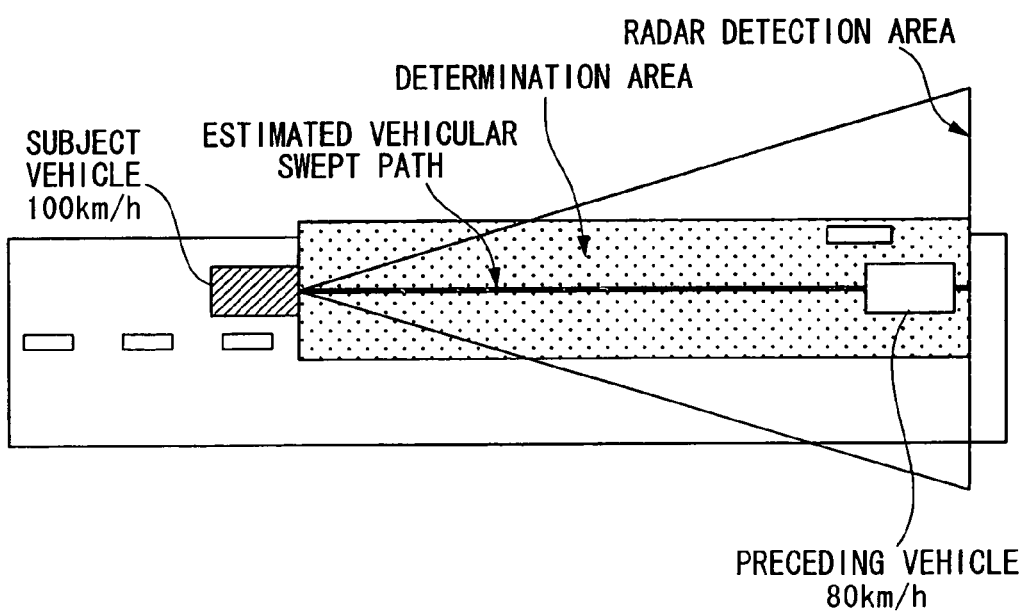
FIG. 14 is a diagram showing a detection area in a fourth embodiment.

Furthermore, an object of separation processing is defined as an object moving in a direction approaching the subject vehicle, using the relative speed obtained by a speed detection section 25. That is, in the example of FIG. 14, a preceding vehicle is located in an area where the radar detection area and the estimated vehicular swept path of the subject vehicle obtained from the track estimation section 33 overlap, and the speed of the subject vehicle is 100 km/h while the speed of the preceding vehicle is 80 km/h, and hence the preceding vehicle is approaching the subject vehicle at 20 km/h. Therefore in the present example, this kind of preceding vehicle is an object of separation processing. In the example of FIG. 14, an object of separation processing is defined as an object that is in the radar detection area, is located inside the estimated vehicular swept path of the subject vehicle obtained from the track estimation section 33, and is moving in a direction approaching the subject vehicle. Therefore it is possible to execute priority separation processing of an object that has a high risk to the travel of the subject vehicle.

What is claimed is:

1. A radar system comprising:
   a plurality of reception antennas which receive incoming waves reflected by an object;
   a transmission wave generating device which generates transmission waves;
   a transmission antenna which transmits transmission waves;
   a mixer which mixes the received waves received by said reception antennas and said transmission waves, and generates beat signals;
   an A/D converter which converts said beat signals to digital signals;
   a storage device which stores said digitized beat signals in association with each of the reception antennas;
   a Fourier transformation device which Fourier transforms said stored beat signals;
   a digital beam forming device which generates beam signals at predetermined pitch angles based on said Fourier transformed signals;
   an orientation detecting device which detects an orientation of said object using said generated beam signals;
   a distance detecting device which detects a distance to said object using said generated beam signals; and
   a signal separation processing device which performs separation processing of said beat signals based on said detected orientation and distance of the object, using said beat signals associated with each of the reception antennas, which are Fourier transformed by said Fourier transformation device, wherein:
   said signal separation processing device performs separation processing of a signal using the maximum entropy method; and
   said signal separation processing device performs separation processing of the signal by using only either one of the real number parts and the imaginary number parts of the signals corresponding to each of the reception antennas, generated by said Fourier transformation device.

2. A radar system according to claim 1, wherein
   said radar system is installed in a vehicle, and further comprises;
   a determination area setting device which sets a predetermined determination area in which to determine an object in front of a subject vehicle, and
   a separation object determination device which defines an object in said determination area as a separation object, based on at least a distance to said detected object and said set determination area,
   and said signal separation processing device performs separation processing of the beat signals, based on the object that is determined as being in said determination area by said separation object determination device.

3. A radar system according to claim 2, wherein there is further provided a track estimation device which estimates a vehicular swept path of a subject vehicle, and
   said determination area setting device sets the determination area in front of the subject vehicle, based on the estimated vehicular swept path of said vehicle, and
   said separation object determination device determines the object in said determination area as a separation object, based on said detected orientation and distance of the object, and said set determination area.

4. A radar system according to claim 2, wherein
   said separation object determination device determines an object for which said detected distance to the object is greater than or equal to a first predetermined value, as a separation object.

5. A radar system according to claim 4, wherein said separation object determination device determines an object for which said detected distance to the object is less than or equal to a second predetermined value, as a separation object.

6. A radar system according to claim 5, wherein said second predetermined value is greater than said first predetermined value.

7. A radar system according to claim 2, wherein said separation object determination device determines said detected object for which a relative speed is a value indicating that it is approaching the subject vehicle, as a separation object.

8. A radar system comprising:
   a plurality of reception antennas which receive incoming waves reflected by an object;
   a transmission wave generating device which generates transmission waves;
   a transmission antenna which transmits transmission waves;
   a mixer which mixes the received waves received by said reception antennas and said transmission waves, and generates beat signals;
   an A/D converter which converts said beat signals to digital signals;
   a storage device which stores said digitized beat signals in association with each of the reception antennas;
   a Fourier transformation device which Fourier transforms said stored beat signals;
   a digital beam forming device which generates beam signals at predetermined pitch angles based on said Fourier transformed signals;
   an orientation detecting device which detects an orientation of said object using said generated beam signals;
   a distance detecting device which detects a distance to said object using said generated beam signals; and
   a signal separation processing device which performs separation processing of said beat signals based on said detected orientation and distance of the object, using said beat signals associated with each of the reception antennas, which are Fourier transformed by said Fourier transformation device, wherein:
   said signal separation processing device performs separation processing of a signal using the maximum entropy method; and
   said signal separation processing device performs separation processing of the signal by using the real number parts or the imaginary number parts of the signals corresponding to each of the reception antennas, generated by said Fourier transformation device, switching the real number parts and the imaginary number parts alternately according to the location of the reception antennas.

9. A radar system according to claim 8, wherein said radar system is installed in a vehicle, and further comprises;
a determination area setting device which sets a predetermined determination area in which to determine an object in front of a subject vehicle, and
a separation object determination device which defines an object in said determination area as a separation object, based on at least a distance to said detected object and said set determination area,
and said signal separation processing device performs separation processing of the beat signals, based on the object that is determined as being in said determination area by said separation object determination device.

10. A radar system according to claim 9, wherein there is further provided a track estimation device which estimates a vehicular swept path of a subject vehicle, and
said determination area setting device sets the determination area in front of the subject vehicle, based on the estimated vehicular swept path of said vehicle, and
said separation object determination device determines the object in said determination area as a separation object, based on said detected orientation and distance of the object, and said set determination area.

11. A radar system according to claim 9, wherein said separation object determination device determines an object for which said detected distance to the object is greater than or equal to a first predetermined value, as a separation object.

12. A radar system according to claim 11, wherein said separation object determination device determines an object for which said detected distance to the object is less than or equal to a second predetermined value, as a separation object.

13. A radar system according to claim 12, wherein said second predetermined value is greater than said first predetermined value.

14. A radar system according to claim 9, wherein said separation object determination device determines said detected object for which a relative speed is a value indicating that it is approaching the subject vehicle, as a separation object.

15. A computer-readable medium encoded with a computer program that, when executed on a computer, performs a process for a radar system, the process comprising:
a first step for mixing received waves received by reception antennas, and transmission waves to generate beat signals, converting said beat signals to digital signals, and storing them in association with each of the reception antennas;
a second step for Fourier transforming said stored beat signals;
a third step for generating beam signals at predetermined pitch angles, based on said Fourier transformed signals;
a fourth step for detecting an orientation of an object using said generated beam signals;
a fifth step for detecting a distance to the object using said generated beam signals;
a sixth step for detecting whether or not there is a plurality of objects at almost the same distance in said Fourier transformed beat signals corresponding to each of the reception antennas, based on said detected orientation and distance of the object; and
a seventh step for performing separation processing of the beat signals, wherein:
said signal separation processing device performs separation processing of a signal using the maximum entropy method; and
said signal separation processing device performs separation processing of the signal by using only either one of the real number parts and the imaginary number parts of the signals corresponding to each of the reception antennas, generated by said Fourier transformation device.

16. A computer-readable medium encoded with a computer program that, when executed on a computer, performs a process for a radar system, the process comprising:
a first step for mixing received waves received by reception antennas, and transmission waves to generate beat signals, converting said beat signals to digital signals, and storing them in association with each of the reception antennas;
a second step for Fourier transforming said stored beat signals;
a third step for generating beam signals at predetermined pitch angles, based on said Fourier transformed signals;
a fourth step for detecting an orientation of an object using said generated beam signals;
a fifth step for detecting a distance to the object using said generated beam signals;
a sixth step for detecting whether or not there is a plurality of objects at almost the same distance in said Fourier transformed beat signals corresponding to each of the reception antennas, based on said detected orientation and distance of the object; and
a seventh step for performing separation processing of the beat signals, wherein:
said signal separation processing device performs separation processing of a signal using the maximum entropy method; and
said signal separation processing device performs separation processing of the signal by using the real number parts or the imaginary number parts of the signals corresponding to each of the reception antennas, generated by said Fourier transformation device, switching the real number parts and the imaginary number parts alternately according to the location of the reception antennas.

* * * * *